3,281,316
FUNGICIDAL COMPOSITIONS CONTAINING SALTS OF ETHYLENE-BIS-DITHIOCARBAMIC ACID AND TIN COMPOUNDS

Otto Scherer, Bad Soden, Taunus, Heinz Frensch, Frankfurt am Main, and Willi Stenger, Kronberg, Taunus, Germany, assignors to Farbwerke Hoechst Aktiengesellschaft vormals Meister Lucius & Bruning, Frankfurt am Main, Germany, a corporation of Germany
No Drawing. Filed May 6, 1965, Ser. No. 453,838
Claims priority, application Germany, May 16, 1964, F 42,906
5 Claims. (Cl. 167—22)

The present invention relates to fungicidal agents to which plants have a high tolerance.

It is known to use organic triphenyltin compounds as fungicides. However, some varieties of cultured plants have a specific sensitivity towards organic tin compounds, so that their use has not always been recommendable. It has, therefore, been proposed to reduce the phytotoxicity of triphenyltin compounds by adding alkaline substances, such as calcium carbonate or sodium carbonate, and hydrophilic substances such as polyvinyl alcohol and methyl cellulose forming colloidal solutions in aqueous media. But these measures are not always satisfactory. When triphenyltin compounds are combined with specific dithiocarbamates, for example manganese-ethylene-bis-dithiocarbamate, the phytotoxicity of the aforesaid organo-tin compounds can be reduced, whereby their field of application is considerably expanded, but with the use of compositions with triphenyltin chloride, for example, very special conditions must be maintained in order to avoid injuries to the plants.

The fungicidal agents according to the present invention contain a combination of a triphenyltin compound of the general formula $$[(C_6H_5)_3Sn]X_n$$

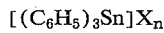

in which X represents an inorganic or organic radical not bound to the tin atom via a carbon atom and $n$ is a whole number corresponding to the valence of the radical X, with a dithiocarbamate, particularly the manganese, zinc, iron or sodium salt of ethylene-bis-dithiocarbamic acid, and at least one further substance having a reducing action on the phytotoxicity, for example an alkaline substance such as calcium carbonate, potassium acetate, sodium acetate, calcium acetate or an oxide or hydroxide of an alkaline-earth metal, and an albumin-containing substance, for example blood albumin, casein, milk powder, or so-called dry corn steep. A ratio of about 1 to 50 parts by weight of the defined triphenyltin compound for 1 part by weight of the dithiocarbamate has proved to be advantageous.

The compositions according to the invention can be used in the form of customary formulations as dusts, wettable substances, granules or pastes. For their preparation the usual dusty or liquid, inert substances, adhesive, dispersing and wetting agents and, if necessary, grinding auxiliaries can be used, such as kaolin, talcum, active silicic acid, calcium carbonate, which simultaneously provokes a favorable alkaline reaction, naphthalene sulfonic acid condensation products, sodium dibutylnaphthalene-sulfonate and partially hydrolized polyvinyl acetate ("70/88" or "30/88") or calcium lignin sulfonate.

The following examples, in which triphenyltin acetate, triphenyltin chloride, triphenyltin hydroxide and bis-(triphenyltin)-oxide were used as triphenyltin compounds illustrate some of the compositions according to the invention and their action on cultured plants. In addition to the phytotoxicity of the compositions, the influence of the compositions on the green weight of the treated plants was tested. In the examples the parts are by weight unless otherwise stated.

EXAMPLE 1

Young tomato plants in the four-leaves stage were treated under identical conditions with so-called wettable powders suspended in water and having the following composition:

Preparation A 50 parts of triphenyltin chloride
40 parts of kaolin
6 parts of the salt of a naphthalene sulfonic acid condensation product
2 parts of sodium dibutylnaphthalene-sulfonate
2 parts of partially hydrolized polyvinyl acetate ("70/88")

Preparation B
ACCORDING TO INVENTION 50 parts of triphenyltin chloride
35 parts of magnesium hydroxide
5 parts of the zinc salt of ethylene-bis-dithiocarbamic acid
10 parts of the aforesaid adhesive dispersing and wetting agents

Preparation C
ACCORDING TO INVENTION 50 parts of triphenyltin chloride
32 parts of anhydrous sodium acetate
5 parts of the manganese salt of ethylene-bis-dithiocarbamic acid
3 parts of aluminium-magnesium silicate
10 parts of the aforesaid adhesive dispersing and wetting agents The tomato plants were sprayed 4 times dripping wet with concentrations of 4000 milligrams, 2000 milligrams and 1000 milligrams, respectively, of triphenyltin chloride per liter of spray liquor and the degree of injury was evaluated after 10 days by visual inspection expressed in numerals 0 to 10, 0 meaning no injury at all and 10 meaning total destruction or decay of the plants. In addition thereto, the green weight of the plants was determined and expressed with reference to the weight of untreated plants. The results of the comparative tests are given in Table I.

TABLE I

| Preparation | Degree of injury to tomato plants upon visual inspection in numerals from 0-10 with the indicated amount of active ingredient per liter of spray liquor. | | | Green weight of the plants as compared to control plants=100 | | |
|---|---|---|---|---|---|---|
|  | 4,000 mg. | 2,000 mg. | 1,000 mg. | 4,000 mg. | 2,000 mg. | 1,000 mg. |
| A | 8.5 | 7.2 | 6.1 | 15 | 28 | 42 |
| B | 1.2 | 0.8 | 0 | 81 | 96 | 100 |
| C | 1.5 | 0.4 | 0 | 95 | 98 | 98 |
| Untreated | 0 | 0 | 0 | 100 | 100 | 100 |

The above table shows that preparations B and C formulated according to the invention do not substantially injure the tomato plants, while preparation A has a strong phytotoxic action, which can also be seen by the reduction of the green weight of the treated plants.

EXAMPLE 2

Young tomato plants in the three-leaves stage were treated under identical conditions with wettable powders suspended in water and having the following composition:

*Preparation A*

20 parts of triphenyltin acetate
65 parts of kaolin
10 parts of the salt of a naphthalene-sulfonic acid condensation product
3 parts of sodium dibutylnaphthalene-sulfonate
2 parts of partially hydrolized polyvinyl acetate ("70/88")

*Preparation B*
ACCORDING TO INVENTION 20 parts of triphenyltin acetate
54 parts of kaolin
6 parts of magnesium hydroxide
5 parts of the sodium salt of ethylene-bis-dithiocarbamic acid
15 parts of the aforesaid adhesive, dispersing and wetting agents

*Preparation C*
ACCORDING TO INVENTION 20 parts of triphenyltin acetate
30 parts of kaolin
6 parts of magnesium hydroxide
25 parts of milk powder
5 parts of the manganese salt of ethylene-bis-dithiocarbamic acid
9 parts of trisodium phosphate
3 parts of calcium lignin sulfonate
2 parts of partially hydrolized polyvinyl acetate ("70/88")

The tomato plants were treated four times as described in Example 1. The following Table II illustrates the advantages of preparations B and C according to the invention over preparation A.

TABLE II

| Preparation | Degree of injury to tomato plants upon visual inspection in numerals from 1-10 with the indicated amount of active ingredient per liter of spray liquor. | | | Green weight of the plants as compared to untreated control plants=100. | | |
|---|---|---|---|---|---|---|
| | 4,000 mg. | 2,000 mg. | 1,000 mg. | 4,000 mg. | 2,000 mg. | 1,000 mg. |
| A | 9.8 | 8.0 | 7.6 | 0 | 15 | 21 |
| B | 1.5 | 1.0 | 0.2 | 81 | 90 | 105 |
| C | 1.0 | 0.8 | 0 | 93 | 98 | 103 |
| Untreated | 0 | 0 | 0 | 100 | 100 | 100 |

EXAMPLE 3

Potato plants cultivated from potato eyes in the four-leaves stage were treated with wettable powders suspended in water and having the following compositions:

*Preparation A*

50 parts of triphenyltin chloride
40 parts of calcium carbonate (chalk)
10 parts of the adhesive, dispersing and wetting agents used in Example 1

*Preparation B*
ACCORDING TO INVENTION 50 parts of triphenyltin chloride
30 parts of milk powder
10 parts of the iron salt of ethylene-bis-dithiocarbamic acid
10 parts of the aforesaid adhesive, dispersing and wetting agents

*Preparation C*
ACCORDING TO INVENTION 50 parts of triphenyltin chloride
30 parts of dry corn steep
10 parts of the iron salt of ethylene-bis-dithiocarbamic acid
10 parts of the aforesaid adhesive, dispersing and wetting agents

*Preparation D*
ACCORDING TO INVENTION 50 parts of triphenyltin chloride
30 parts of casein
10 parts of the manganese salt of ethylene-bis-dithiocarbamic acid
10 parts of the aforesaid adhesive, dispersing and wetting agents

*Preparation E*
ACCORDING TO INVENTION 50 parts of triphenyltin chloride
35 parts of calcium carbonate (chalk)
5 parts of the manganese salt of ethylene-bis-dithiocarbamic acid
10 parts of the aforesaid adhesive, dispersing and wetting agents The potato plants were sprayed six times with a concentration of 8000 milligrams, 4000 milligrams and 2000 milligrams, respectively, of active ingredient per liter of spray liquor and after 10 days the plants were examined. The degree of injury is indicated in the following Table III in numerals from 0 to 10. In the table there is also given the green weight of the plants in comparison to that of untreated control plants.

The results clearly show that the phytotoxicity of triphenyltin chloride is considerably reduced by the additives according to the invention.

TABLE III

| Preparation | Degree of injury to potato plants upon visual inspection in numerals 0-10 with the indicated amount of active ingredient per liter of spray liquor. | | | Relative green weight of the plants at indicated concentrations. | | |
|---|---|---|---|---|---|---|
| | 8,000 mg. | 4,000 mg. | 2,000 mg. | 8,000 mg. | 4,000 mg. | 2,000 mg. |
| A | 6.1 | 4.2 | 1.8 | 65 | 71 | 86 |
| B | 0.8 | 0 | 0 | 100 | 102 | 99 |
| C | 0.8 | 0 | 0 | 105 | 102 | 108 |
| D | 0.7 | 0 | 0 | 97 | 99 | 102 |
| E | 0.9 | 0.1 | 0 | 98 | 99 | 99 |
| Untreated | 0 | 0 | 0 | 100 | 100 | 100 |

EXAMPLE 4

Young tomato plants in the three-leaves stage were treated under identical conditions with wettable powders suspended in water and having the following composition:

*Preparation A*

20 parts of triphenyltin hydroxide
65 parts of kaolin
15 parts of the adhesive, dispersing and wetting agents used in Example 2 (Preparation A)

*Preparation B*
ACCORDING TO INVENTION 20 parts of triphenyltin hydroxide
20 parts of kaolin
15 parts of milk powder
20 parts of magnesium hydroxide
10 parts of the manganese salt of ethylene-bis-dithiocarbamic acid 15 parts of the aforesaid adhesive, dispersing and wetting agents

*Preparation C*

ACCORDING TO INVENTION 20 parts of triphenyltin hydroxide
20 parts of kaolin
15 parts of hydrolized albumin
20 parts of magnesium oxide
10 parts of the zinc salt of ethylene-bis-dithiocarbamic acid
15 parts of the aforesaid adhesive, dispersing and wetting agents

*Preparation D*

ACCORDING TO INVENTION 20 parts of triphenyltin hydroxide
20 parts of kaolin
15 parts of milk powder
20 parts of magnesium hydroxide
10 parts of the manganese salt of ethylene-bis-dithiocarbamic acid
15 parts of the aforesaid adhesive, dispersing and wetting agents The plants were sprayed dripping wet 4 times with concentration of 4000 milligrams, 2000 milligrams and 1000 milligrams, respectively, of active ingredient per liter of spray liquor. After 10 days the degree of injury to the plants was evaluated by visual inspection. The result in numerals 0 to 10 is indicated in Table IV. The values clearly show that the phytotoxicity of triphenyltin hydroxide is considerably reduced by the additives according to the invention.

TABLE IV

| Preparation | Degree of injury to tomato plants upon visual inspection in numerals 0-10 with the indicated concentration of active ingredient per liter of spray liquor | | | Green weight of the plants as compared with untreated plants=100 | | |
|---|---|---|---|---|---|---|
| | 4,000 mg. | 2,000 mg. | 1,000 mg. | 4,000 mg. | 2,000 mg. | 1,000 mg. |
| A | 8.5 | 6.9 | 5.2 | 15.8 | 27.5 | 48.3 |
| B | 0.8 | 0 | 0 | 89 | 100 | 99 |
| C | 0.8 | 0 | 0 | 96 | 107 | 112 |
| D | 0.5 | 0 | 0 | 101 | 106 | 103 |
| Untreated | 0 | 0 | 0 | 100 | 100 | 100 |

EXAMPLE 5

Potato plants were cultivated from potato eyes and sprayed dripping wet in the four-leaves stage with wetting powders suspended in water and having the following composition:

*Preparation A*

50 parts of triphenyltin chloride
36 parts of active silicic acid
8 parts of the salt of a naphthalene-sulfonic acid condensation product
3 parts of sodium dibutylnaphthalene-sulfonate
3 parts of partially hydrolized polyvinyl acetate ("70/88")

*Preparation B*

ACCORDING TO INVENTION 50 parts of triphenyltin chloride
6 parts of magnesium oxide
29 parts of milk powder
1 part of manganese salt of ethylene-bis-dithiocarbamic acid
14 parts of the aforesaid adhesive, dispersing and wetting agents Each of the preparations was used in a concentration of 5000 milligrams, 2500 milligrams, and 1250 milligrams, respectively, of active ingredient per liter of spray liquor. The degree of injury was examined after a fortnight upon visual inspection and the green weight of the plants was determined as described in the preceding examples. Table V shows that the additives according to the invention strongly reduce the phytotoxicity of triphenyltin chloride.

TABLE V

| Preparation | Degree of injury to potato plants upon visual inspection in numerals 0-10 with the indicated concentration of active ingredient per liter of spray liquor | | | Green weight of plants in comparison with untreated plants=100 | | |
|---|---|---|---|---|---|---|
| | 5,000 mg. | 2,500 mg. | 1,250 mg. | 5,000 mg. | 2,500 mg. | 1,250 mg. |
| A | 9.5 | 7.6 | 4.3 | 21 | 36 | 65 |
| B | 1.5 | 0.7 | 1.3 | 90 | 100 | 104 |
| Untreated | 0 | 0 | 0 | 100 | 100 | 100 |

EXAMPLE 6

Young bush beans in the one leave stage were treated with aqueous suspensions of wettable powders of the following composition:

*Preparation A*

60 parts of triphenyltin acetate
30 parts of kaolin
10 parts of the adhesive, dispersing and wetting agents used in Example 1 (Preparation A)

*Preparation B*

ACCORDING TO INVENTION 60 parts of triphenyltin acetate
25 parts of blood albumin
5 parts of the manganese salt of ethylene-bis-dithiocarbamic acid
3 parts of the salt of a naphthalene-sulfonic acid condensation product
2 parts of sodium dibutylnaphthalene-sulfonate The preparations were applied 4 times under identical conditions in a concentration of 3000 milligrams, 1500 milligrams and 750 milligrams, respectively, of active ingredient per liter of spray liquor. After 10 days the degree of injury to the plants was determined upon visual inspection and indicated in numerals from 0 to 10. Table VI shows that the additives according to the invention considerably reduce the phytotoxicity.

TABLE VI

| Preparation | Degree of injury to bush bean plants upon visual inspection in numerals 0-10 with the indicated concentration of active ingredient per liter of spray liquor | | |
|---|---|---|---|
| | 3,000 mg. | 1,500 mg. | 750 mg. |
| A | 7.2 | 6.0 | 4.5 |
| B | 1.1 | 0.4 | 0 |
| Untreated | 0 | 0 | 0 |

EXAMPLE 7

Young tomato plants in the four-leaves stage were treated with aqueous suspensions of wettable powders of the following composition:

*Preparation A*

50 parts of triphenyltin chloride
36 parts of kaolin
9 parts of the salt of a naphthalene-sulfonic acid condensation product
3 parts of sodium dibutyl-naphthalene-sulfonate
2 parts of calcium lignin-sulfonate

Preparation B
ACCORDING TO INVENTION 50 parts of triphenyltin chloride
18 parts of calicum hydroxide
18 parts of the manganese salt of ethylene-bis-dithiocarbamic acid
14 parts of the aforesaid adhesive, dispersing, and wetting agents

Preparation C
ACCORDING TO INVENTION 50 parts of triphenyltin chloride
18 parts of dry corn steep
18 parts of the manganese salt of ethylene-bis-dithiocarbamic acid
14 parts of the aforesaid adhesive, dispersing and wetting agents

Preparation D
ACCORDING TO INVENTION 50 parts of triphenyltin chloride
15 parts of milk powder
15 parts of magnesium hydroxide
6 parts of the manganese salt of ethylene-bis-dithiocarbamic acid
14 parts of the aforesaid adhesive, dispersing and wetting agents All preparations were applied 4 times under identical conditions, each time in a concentration of 4000 milligrams, 2000 milligrams and 1000 milligrams, respectively, of active ingredient per liter of spray liquor. The plants were uniformly sprayed dripping wet and after 10 days the degree of injury was evaluated by visual inspection in numerals from 0 to 10. Besides, the green weight of the plants was controlled.

The results are summarized in Table VII. It can be seen from the values that the additives according to the invention considerably reduce the phytotoxicity of triphenyltin chloride.

TABLE VII

| Preparation | Degree of injury to tomato plants upon visual inspection in numerals from 0-10 with the indicated concentration of active ingredient per liter of spray liquor | | | Green weight of plants in comparison with untreated control plants =100 | | |
| --- | --- | --- | --- | --- | --- | --- |
|  | 4,000 mg. | 2,000 mg. | 1,000 mg. | 4,000 mg. | 2,000 mg. | 1,000 mg. |
| A | 9.8 | 7.6 | 5.8 | 8.5 | 21 | 36 |
| B | 0.8 | 0.3 | 0 | 92 | 107 | 100 |
| C | 1.5 | 0.7 | 0 | 93 | 98 | 102 |
| D | 0.5 | 0.3 | 0 | 100 | 100 | 98 |
| Untreated | 0 | 0 | 0 | 100 | 100 | 100 |

EXAMPLE 8

Young potato plants cultivated from potato eyes in the three-leaves stage were sprayed with aqueous suspensions of wettable powders having the following composition:

Preparation A 60 parts of bis-(triphenyltin)-oxide
30 parts of active silicic acid
10 parts of the adhesive, dispersing and wetting agents used in Example 1

Preparation B
ACCORDING TO INVENTION 60 parts of bis-(triphenyltin)-oxide
28 parts of calcium hydroxide
2 parts of the manganese salt of ethylene-bis-dithiocarbamic acid
10 parts of the aforesaid adhesive, dispersing and wetting agents

Preparation C
ACCORDING TO INVENTION 60 parts of bis-(triphenyltin)-oxide
15 parts of calcium acetate
10 parts of casein
5 parts of the manganese salt of ethylene-bis-dithiocarbamic acid
10 parts of the aforesaid adhesive, dispersing and wetting agents All preparations were applied 4 times under identical conditions in concentrations of 6000 milligrams, 3000 milligrams and 1500 milligrams, respectively, of active ingredient per liter of spray liquor. The plants were uniformly sprayed dripping wet and the degree of injury was evaluated after 10 days and expressed in numerals from 0 to 10. Besides, the green weight of the plants was controlled. Table VIII illustrates the influence of the additives according to the invention on the pytotoxicity of bis-(triphenyltin)-oxide.

TABLE VIII

| Preparation | Degree of injury to potato plants upon visual inspection in numerals from 0-10 with the indicated concentration of active ingredient per liter of spray liquor | | | Green weight of the plants as compared with untreated plants=100 | | |
| --- | --- | --- | --- | --- | --- | --- |
|  | 6,000 mg. | 3,000 mg. | 1,500 mg. | 6,000 mg. | 3,000 mg. | 1,500 mg. |
| A | 8.5 | 6.3 | 4.8 | 21 | 38 | 75 |
| B | 0.3 | 0.3 | 0 | 98 | 102 | 110 |
| C | 0.5 | 0.2 | 0 | 103 | 106 | 110 |
| Untreated | 0 | 0 | 0 | 100 | 100 | 100 |

We claim:
1. A fungicidal agent comprising a combination of a member of the group consisting of triphenyltin acetate, triphenyltin chloride, triphenyltin hydroxide, and bis-(triphenyltin) oxide with a salt of ethylene-bis-dithiocarbamic acid and at least one substance reducing phytotoxicity selected from the group consisting of alkali metal and alkaline earth metal acetates and carbonates, alkaline earth metal oxides and hydroxides, blood albumin, casein, milk powder, and dry corn steep.
2. A fungicidal agent as in claim 1 wherein said dithiocarbamate is the manganese, zinc, sodium, or iron salt of ethylene-bis-dithiocarbamic acid.
3. A fungicidal agent as in claim 1 comprising 1–50 parts by weight of triphenyltin compound per 1 part by weight of dithiocarbamate.
4. A fungicidal agent as in claim 1 in the form of an aqueous solution comprising at least 1000 mg. of triphenyltin compound per liter.
5. A method for the control of pytopathogenic microorganisms which comprises treating plants with a fungicidal agent as defined in claim 1.

References Cited by the Examiner
UNITED STATES PATENTS

| | | | |
| --- | --- | --- | --- |
| 2,665,285 | 1/1954 | Johnson | 167—22 |
| 2,710,822 | 6/1955 | Golding et al. | 167—22 |
| 2,797,181 | 6/1957 | Drexel | 167—22 |
| 2,974,156 | 5/1961 | Sabatzki | 167—22 |
| 3,085,042 | 4/1963 | Luginbuhl | 167—22 |
| 3,159,531 | 12/1964 | Bruckner et al. | 167—30 |

OTHER REFERENCES

Frear, Chemistry of the Pesticides, D. Van Nostrand Co., Inc., New York 3, New York (1955), p. 421.

JULIAN S. LEVIT, *Primary Examiner.*

STANLEY J. FRIEDMAN, *Assistant Examiner.*